US010623099B2

United States Patent
Walker et al.

(10) Patent No.: US 10,623,099 B2
(45) Date of Patent: Apr. 14, 2020

(54) MODULAR OPTO-ELECTRONIC TELEMETRY DEVICE AND METHODS THEREOF

(71) Applicant: Micatu Inc., Horseheads, NY (US)

(72) Inventors: Kris Walker, Watkins Glen, NY (US); James Kennedy, Corning, NY (US); Michael Oshetski, Horseheads, NY (US); Atul Pradhan, Pittsford, NY (US)

(73) Assignee: Micatu Inc., Horseheads, NY (US)

( * ) Notice: Subject to any disclaimer, the term of this patent is extended or adjusted under 35 U.S.C. 154(b) by 0 days.

(21) Appl. No.: 15/883,966

(22) Filed: Jan. 30, 2018

(65) Prior Publication Data

US 2018/0219626 A1    Aug. 2, 2018

Related U.S. Application Data

(60) Provisional application No. 62/452,134, filed on Jan. 30, 2017.

(51) Int. Cl.
*H04B 10/25* (2013.01)
*H04Q 9/00* (2006.01)

(52) U.S. Cl.
CPC ............ *H04B 10/25* (2013.01); *H04Q 9/00* (2013.01); *H04Q 2209/30* (2013.01); *H04Q 2209/82* (2013.01)

(58) Field of Classification Search
CPC ...... H04B 10/25; H04Q 9/00; H04Q 2209/30; H04Q 2209/82
See application file for complete search history.

(56) References Cited

U.S. PATENT DOCUMENTS

| 4,945,201 | A | * | 7/1990 | Ito ...................... | B23K 11/252 |
| | | | | | 219/110 |
| 4,988,885 | A | * | 1/1991 | Lindstrom .......... | G01C 13/004 |
| | | | | | 250/239 |
| 5,371,353 | A | | 12/1994 | Shibuya | |
| 6,736,770 | B2 | | 5/2004 | Leysieffer et al. | |
| 2005/0169645 | A1 | * | 8/2005 | Diaz ..................... | H03K 5/086 |
| | | | | | 398/202 |
| 2011/0242532 | A1 | * | 10/2011 | McKenna ............ | A61B 5/0075 |
| | | | | | 356/319 |
| 2013/0034330 | A1 | * | 2/2013 | Barron ................ | G02B 6/4454 |
| | | | | | 385/96 |
| 2013/0051789 | A1 | * | 2/2013 | Shih ..................... | H04B 10/40 |
| | | | | | 398/16 |

(Continued)

OTHER PUBLICATIONS

PCT International Search Report and Written Opinion for corresponding PCT/US2018/015973, dated Aug. 8, 2019.

*Primary Examiner* — Amine Benlagsir
(74) *Attorney, Agent, or Firm* — Pepper Hamilton LLP

(57) ABSTRACT

An opto-electronic telemetry device includes a housing having an analog optical conversion device located therein. The analog optical conversion device is configured to convert an optical signal to a digital facsimile. A sensor cable is coupled to the analog optical conversion device within the housing and at least one optical sensor located external to the housing. The sensor cable receives the optical signal from the at least one optical sensor and provides the optical signal to the analog optical conversion device. A method of making a modular opto-electronic telemetry device is also disclosed.

8 Claims, 3 Drawing Sheets

(56) References Cited

U.S. PATENT DOCUMENTS

| | | | | |
|---|---|---|---|---|
| 2013/0158413 A1* | 6/2013 | Lisogurski | ......... | A61B 5/14551 |
| | | | | 600/476 |
| 2015/0204668 A1* | 7/2015 | Tazartes | ................ | G01C 19/00 |
| | | | | 73/504.02 |
| 2016/0003691 A1* | 1/2016 | Arunasalam | ........... | G01K 13/02 |
| | | | | 374/143 |

* cited by examiner

MODULAR OPTO-ELECTRONIC TELEMETRY DEVICE AND METHODS THEREOF

This application claims the benefit of U.S. Provisional Patent Application Ser. No. 62/452,134, filed Jan. 30, 2017, which is hereby incorporated by reference in its entirety.

FIELD OF THE INVENTION

The present technology is related to the technical field of conditioning monitoring. More particularly, the present technology is related to the technical field of optical electronic signal condition monitoring. The present technology relates to an opto-electrical telemetry device and a method of making such device.

BACKGROUND OF THE INVENTION

A number of technologies exist to monitor critical infrastructure such as electrical grids. Most of these systems include wire-based voltage and current sensors, which rely on inductive and capacitive sensors for monitoring the level of voltage or current. The voltage and current sensors are then coupled to associated data processing units that are required to convert the measured inductance and/or capacitance to the voltage or current values measured by the sensors. The sensors are connected to the associated data processing units via copper wires. These wire-based monitoring systems have a number of limitations. For example, wire-based systems suffer from issues of reliability, are not as accurate as newer sensors (i.e., accuracy is approximately +/−2%), and the measurement accuracy can be affected by fluctuations in temperature. For example, signal transmitted long distances over copper wire can be degraded.

Other grid monitoring technologies that address the problems with wire-based systems include wireless monitoring technologies. These wireless monitoring systems clamp onto power line cables and harvest energy for operation directly from the lines. Unlike the wire-based monitoring technologies, the wireless monitoring systems that monitor voltage and current do not send data via copper wires, but instead rely on wireless communications, such as cellular signals. The wireless sensors used in wireless condition monitoring for electrical grids also suffer from limitations in reliability. By way of example, wireless transmission requires that the sensor incorporate electronics that are sensitive to electromagnetic fields very near a strong electromagnetic field, which can impact the overall reliability of such systems.

Optical sensors provide a third type of technology for monitoring electrical grids. Optical sensors provide a number of advantages over wire-based and wireless monitoring systems. By way of example, optical sensors provide greater accuracy, better reliability, and easier methods for temperature compensation. Unlike wire-based and wireless technologies, optical sensors rely on analog optical telemetry for transmission of data. Analog optical telemetry offers a number of advantages relative to copper wires and wireless data transmission. For example, the optical signals do not suffer significant degradation of the signal when transmitted over long distances in the same manner as copper wire. Additional, optical systems do not require sensors including electronics that are sensitive to electro-magnetic fields very near a strong electromagnetic field, such as in electrical grids. While analog telemetry offers advantages over these other signal transmission methods, it can suffer to impairment due to connection quality.

Impairments in analog optical telemetry may occur due things such as the condition of optical components, contamination, moisture, or operator errors. The impairment can lead to optical losses that lead to inaccurate data and lost information, which can have major impacts on critical infrastructure, such as electrical grids.

The present technology is directed to overcoming these and other deficiencies in the art of analog optical telemetry.

SUMMARY OF THE INVENTION

An opto-electronic telemetry device includes a housing having an analog optical conversion device located therein. The analog optical conversion device is configured to convert an optical signal to a digital facsimile. A sensor cable is coupled to the analog optical conversion device within the housing and at least one optical sensor located external to the housing. The sensor cable receives the optical signal from the at least one optical sensor and provides the optical signal to the analog optical conversion device.

A method of making an opto-electronic telemetry device includes providing a housing having an analog optical conversion device located therein. The analog optical conversion device is configured to convert an optical signal to a digital facsimile. A sensor cable is coupled to the analog optical conversion device within the housing. The sensor cable is coupled to at least one optical sensor located external to the housing. The sensor cable receives the optical signal from the at least one optical sensor and provides the optical signal to the analog optical conversion device.

The present technology provides a modular opto-electronic telemetry device and methods thereof to simplify the installation of optical sensors. The present technology advantageously provides an opto-electrical telemetry system that moves the optical connection system to the digital electronic domain, which is insensitive to such impairments such as the condition of optical components, contamination, moisture, or operator errors. The present technology eliminates the need to make optical connections in the field, simplifying system installation and minimizing the risk of poor connections. For example, rather than making connections in the field, all critical optical connections may be made in a controlled environment during manufacture by fusion or mechanical splicing of optical fiber components during assembly. This eliminates issues such as operator error, component degradation, component damage, and the risk of moisture permeating the system, which are problems that are often encountered during field installation.

The present technology provides a modular telemetry system that can facilitate field installation, which becomes plug and play, thus requiring minimal technical intervention and eliminating the need for field calibration and environmental offsets. Similarly, the modular connection system of the present technology for optical sensors facilitates straightforward and simple field replacement. In addition to minimizing the risk of installation errors, the modular optical installation system of the present technology provides a cost savings as labor hours dedicated to system installation are minimized.

The present technology relates to a modular upgradable system for connection with optical sensors, including but not limited to optical voltage, current, and temperature sensors among others. The components of the system are self-contained and may include local Digital Signal Processor (DSP) devices, non-volatile memory, and calibration information. The modular system of the present technology enables calibration during manufacture, along with storage of calibration parameters and configuration files in a non-volatile device.

Similarly, the modular system of the present technology solves engineering, manufacturing, and field issues of optical connector degradation and contamination, and therefore optical loss, by moving the connection interface from the optical domain to the digital electronic domain. Such optical loss is a major challenge in an analog optical telemetry systems.

Additionally the modular system of the present technology enables field replacement that does not require external reference calibration. Thus field replacement becomes plug and play. This reduces installation time and required skill set of installation personnel, thus providing significant cost savings.

Other benefits of the present technology include its open design, which permits introduction of pluggable modules to address parameters such as voltage, current, temperature, and vibration measurement within a common measurement system platform. It also provides a common optical processing and communications platform for industrial, automation, condition monitoring, and utility markets.

The modular system of the present technology advantageously uses standard physical interfaces and communications protocols. This enables sensors associated with the modular system to connect within the "Internet of Things" while maintaining cybersecurity standards to IEEE 1686. This will be important for preemptive condition monitoring systems where alarms are triggered due to wear, degradation, and failure.

The present technology takes optical light signals and passes them through an analog to digital conversion to produce digital electronic facsimiles. Subsequently the digital electronic facsimiles can be processed using a digital signal processor applying appropriate algorithms. This is unique to optical analog telemetry systems. An analog optical module consisting of a Data Acquisition (DAQ) system that utilizes light detectors such as photodiodes and electrical signal amplifiers accomplishes conversion of the optical signal to an analog electrical signal.

DETAILED DESCRIPTION

The present technology relates to an opto-electrical telemetry device and a method of making such device.

An opto-electronic telemetry device includes a housing having an analog optical conversion device located therein. The analog optical conversion device is configured to convert an optical signal to a digital facsimile. A sensor cable is coupled to the analog optical conversion device within the housing and at least one optical sensor located external to the housing. The sensor cable receives the optical signal from the at least one optical sensor and provides the optical signal to the analog optical conversion device.

Figure 1:
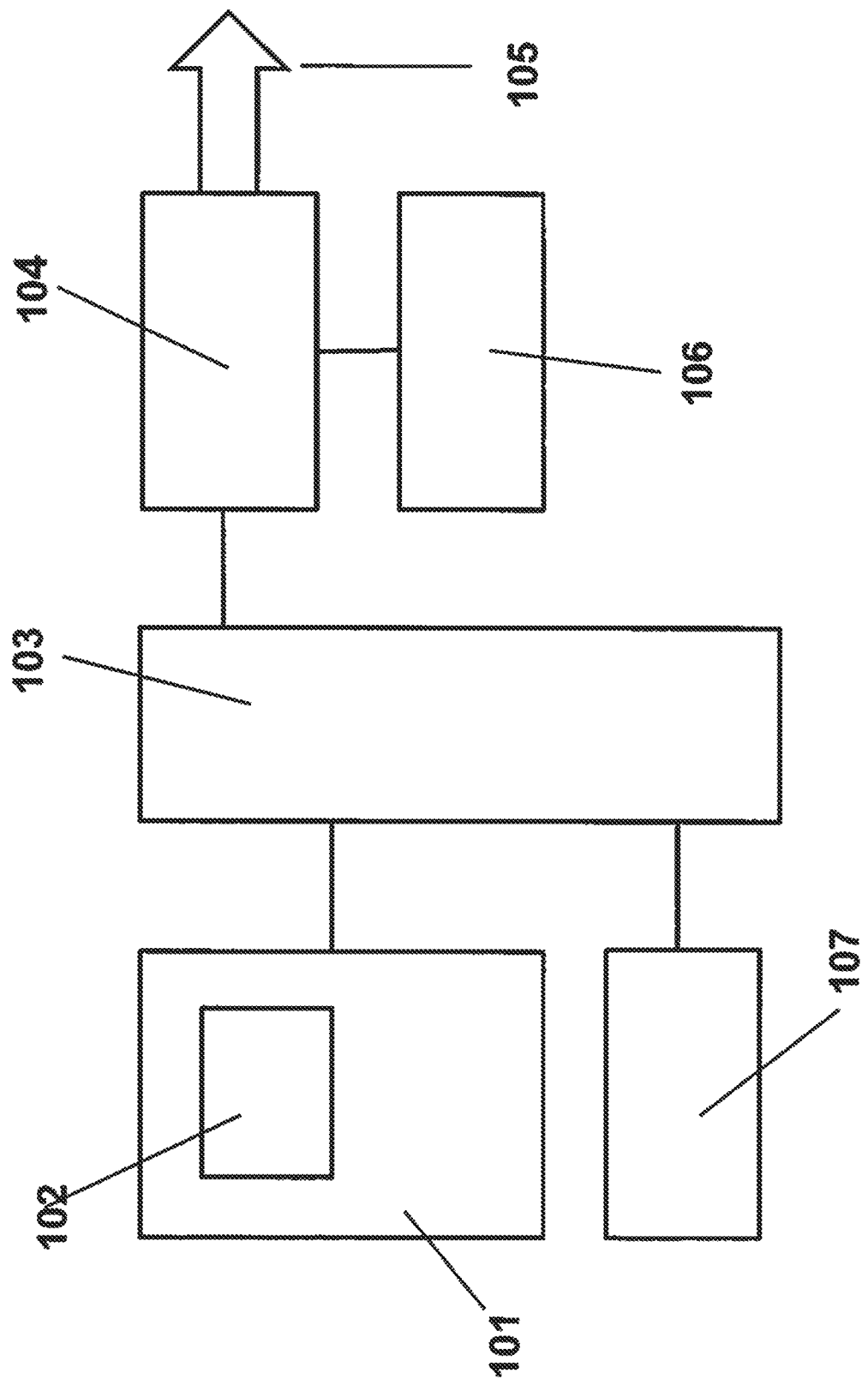
FIG. 1 is a schematic diagram of one example of an opto-electronic telemetry device of the present technology.
Figure 2:
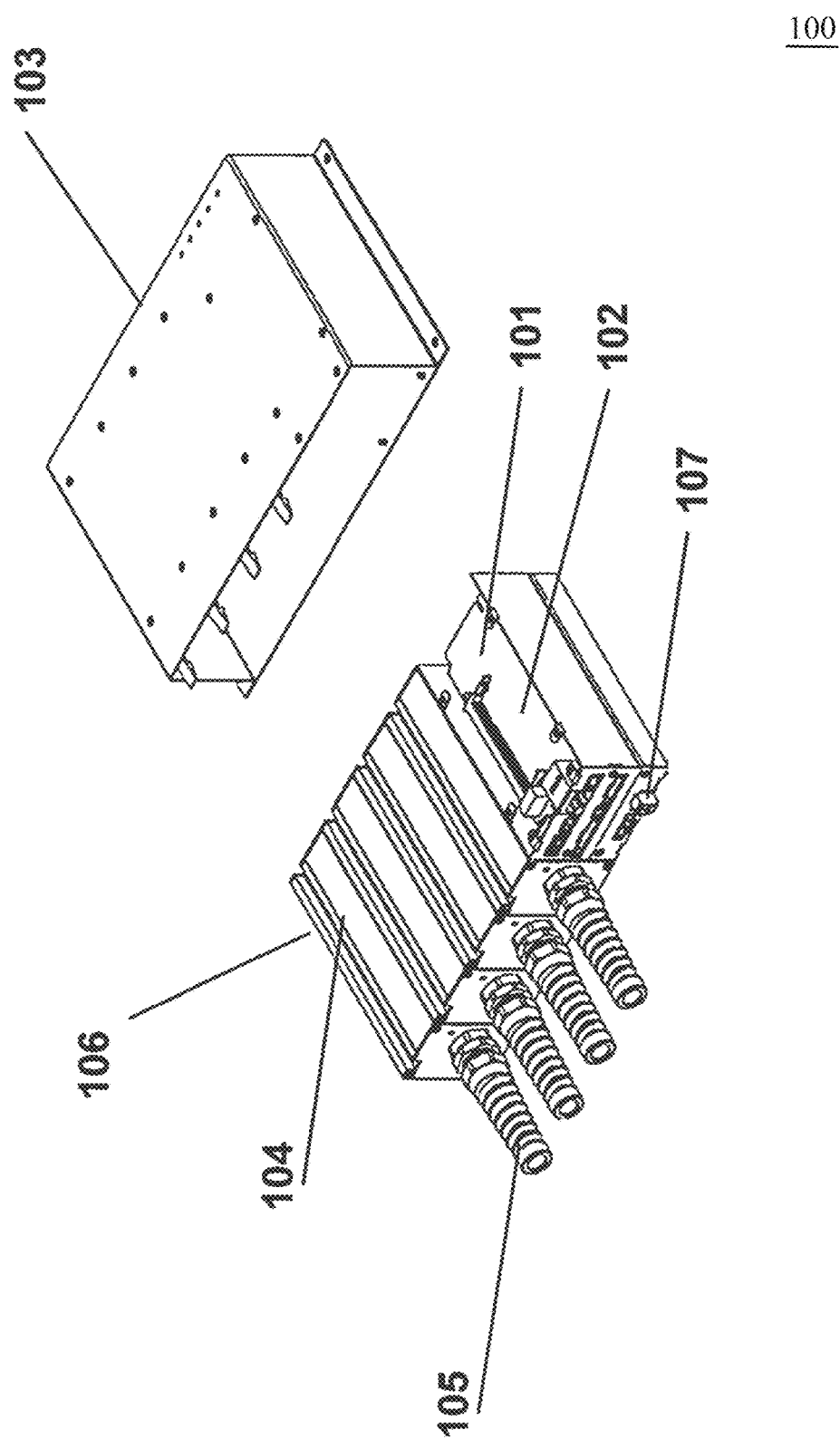
FIG. 2 is a perspective schematic partially exploded view of an exemplary opto-electronic telemetry device of the present technology.
Figure 3:
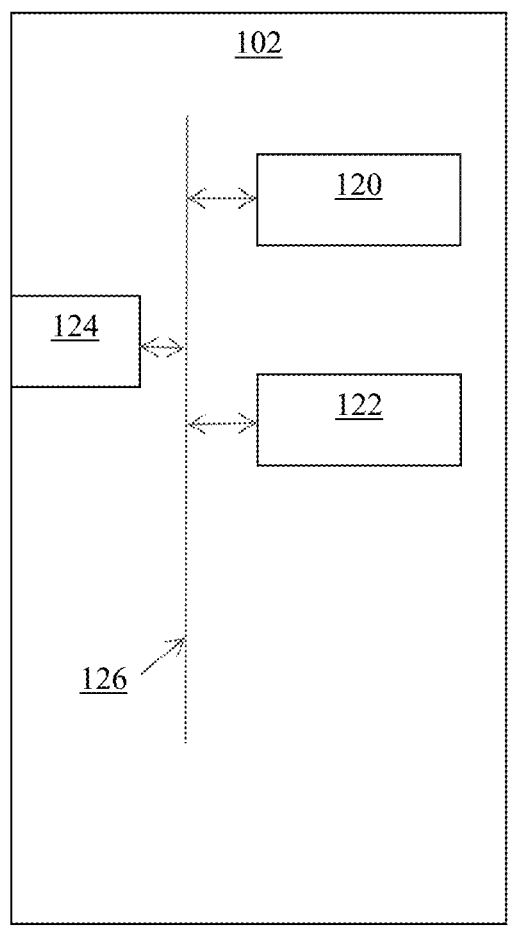
FIG. 3 is a block diagram of an exemplary microcontroller that may be utilized with the opto-electronic telemetry device shown in FIGS. 1 and 2.

Referring now to FIGS. 1-3, an exemplary modular opto-electronic telemetry device 100 of the present technology is illustrated. The modular opto-electronic telemetry device 100 of the present technology includes a Printed Circuit Board Assembly (PCBA) carrier 101, a microcontroller 102, a backplane 103, an analog optical conversion device 104, a sensor cable 105, an optional temperature sensor 106, and a power supply 107, although the opto-electronic telemetry device 100 may include other types and/or numbers of additional components, devices, or elements in other combinations. In one example, one or more components of opto-electronic telemetry device 100 may be located in a weathertight housing, such as a hermetically sealed housing to protect the components from the external environment. Encapsulation of the device ensures that it is impermeable to moisture and other environmental contaminants. In one example, the microcontroller 102 and the analog optical conversion device 104 are co-located in the housing, although other components may also be stored in the housing. The present technology provides a modular device. The modularity of the present technology solves numerous engineering, manufacturing, and field issues common with optical sensors, such as connector degradation and contamination, which results in optical loss and is a major challenge in an analog optical telemetry system.

The present technology provides a number of advantages including providing a modular opto-electronic telemetry device that moves the optical connection system to the digital electronic domain, which is insensitive to such impairments such as the condition of optical components, contamination, moisture, or operator errors, provides easy installation and eliminates the need to make optical connections in the field, allows for easy upgrades and calibration, and that utilizes standard physical interfaces and communications protocols. This enables sensors associated with the modular system to connect within the "Internet of Things" while maintaining cybersecurity standards to IEEE 1686. This will be important for preemptive condition monitoring systems where alarms are triggered due to wear, degradation, and failure.

The modular opto-electronic telemetry device 100 of the present technology comprises a standardized bus system. The PCBA carrier 101 may be any PCBA known in the art. In one example, the PCBA carrier 101 is designed to facilitate easy upgrades in order to accommodate increased computing capacity. In this example, the microcontroller 102 is located on the PCBA 101. In one example, the microcontroller 102 is a CPU daughter card, although other types and/or numbers of processing units may be employed. Although the microcontroller 102 is described as being located on the PCBA carrier 101, it is to be understood that the microcontroller 102 could be located in other locations, including being located remotely from the modular opto-electronic telemetry device 100, by way of example only.

Referring now more specifically to FIG. 3, in one example, the present technology is utilized with a microcontroller 102 that includes a processor 120, a memory 122, and a communication interface 124, which are coupled together by a bus 126 or other communication link, although other numbers and types of systems, devices, components, and elements in other configurations and locations can be used.

The processor 120 executes a program of instructions stored in memory 122 for one or more aspects of the present technology. Other numbers and types of systems, devices, components, and elements in other configurations and locations can be used to execute the program of instructions stored in the memory 122.

The memory 122 stores these programmed instructions for one or more aspects of the present technology, although some or all of the programmed instructions could be stored and/or executed elsewhere. A variety of different types of memory storage devices, such as a random access memory (RAM), read only memory (ROM), hard disk, CD ROM, DVD ROM, or other computer readable medium which is read from and written to by a magnetic, optical, or other reading and writing system that is coupled to the processor 120, can be used for the memory 122. By way of example, the memory 122 can store calibration information, although the calibration information could also be stored within the analog optical conversion device 104, enables field replacement without the need for external reference calibration. Thus field replacement becomes plug and play. This reduces installation time and required skill set of installation personnel, which provides a cost savings.

The communication interface 124 is used to operatively couple and communicate between the microcontroller 102 and one or more other computing devices via a communications network. Other types and numbers of communication networks or systems with other types and numbers of connections and configurations can be used for communication between the computing device and one or more other computing devices. By way of example only, the communications network could use TCP/IP over Ethernet and industry-standard protocols, including NFS, CIFS, SOAP, XML, LDAP, and SNMP. Other types and numbers of communication networks, such as a direct connection, a local area network, a wide area network, modems and phone lines, e-mail, and wireless communication technology, each having their own communications protocols, can be used by the communication networks.

The main PCBA carrier 101 connects the microcontroller to a backplane 103. In this example, the backplane 103 is a standard electronic interface to system bus with six connectors, although other types of backplanes with other numbers of connects can be utilized. The backplane 103 communicatively couples the microcontroller 102 to the analog optical conversion device 104, which includes calibration and temperature compensation. In this example, the analog optical conversion device is self-contained. Although a single analog optical conversion device 104 is described, the opto-electronic telemetry device could include additional analog optical conversion devices as shown in FIG. 2. The use of the backplane 103 allows for easy interconnection between the analog optical conversion device 104 and the microcontroller 102 that allows for interchangeability in the opto-electronic telemetry device 100. The modular system of the present technology uses standard physical interfaces and communications protocols. This enables sensors associated with the modular system to connect within the "Internet of Things" while maintaining cybersecurity standards to IEEE 1686, which is important for preemptive condition monitoring and degradation alarming.

The self-contained analog optical conversion device 104 includes an optical to electronic convertor that converts an optical signal to an analog electrical signal. In this example, the self-contained analog optical conversion device 104 contains optical to electronic components, such as photodiodes and electrical signal amplifiers, using construction methods that avoid the need for optical connectors, although other components may be utilized for the optical to analog conversion. The analog optical conversion device 104 may also include other components, such as additional optics including various lenses. In one example, the optical components in the self-contained analog optical conversion device are preassembled and aligned such that the analog optical conversion device 104 may be fused or mechanically spliced to the main sensor cable 105, by way of example only. The analog optical conversion device 104 also includes an analog to digital convertor that converts the analog electrical signal to a digital signal that is a digital facsimile of the received optical signal. In one example, the analog optical conversion device 104 may further have a non-volatile memory that stores calibration information related to measure of the any of the optical signals that may be introduced to the analog optical conversion device 104.

In this example, the main sensor cable 105 comprises a plurality of pigtailed fibers that are connectable to various sensing devices. Although one sensor cable 105 is described, a plurality of sensor cables each employed with a separate analog optical conversion device 104 may be employed as shown in FIG. 2. The plurality of pigtailed fibers in the sensor cable 105 can each in turn be connected to one or more optical sensors. The opto-electronic telemetry device 100 may be utilized with optical sensors including but not limited to optical voltage, current, and temperature sensors among others. By way of example, the fibers are mechanically spliced or fused to the components of the optical sensor to provide an integral unit including the optical sensors, the fibers, and the analog optical conversion device. The fusion spliced optical connections between both the optical sensors and the components of the analog optical conversion device 104 ensure high reliability optical to electrical conversion of optical signals. This eliminates the variability of optical fiber connections and moves the mandatory connections to an insensitive digital electronic domain.

In this example, the temperature sensor 106 is coupled to the analog optical conversion device 104 and provides integral temperature sensing at the sensing point. In this example, the temperature sensor 104 is a single optical temperature sensor. This permits compensation for actual ambient temperature.

The opto-electronic telemetry device 100 also includes a power supply 107. In this example, the power supply 107 is a modular PCBA, 10-28 VDC power supply that is configured to be connected to the backplane 103 in order to provide power to each of the components in the opto-electronic telemetry device 100, including the analog optical conversion device 104. The modular PCBA, 10-28 VDC power supply 107 permits integration to any AC or DC power source.

A method of making an opto-electronic telemetry device includes providing a housing having an analog optical conversion device located therein. The analog optical conversion device is configured to convert an optical signal to a digital facsimile. A sensor cable is coupled to the analog optical conversion device within the housing. The sensor cable is coupled to at least one optical sensor located external to the housing. The sensor cable receives the optical signal from the at least one optical sensor and provides the optical signal to the analog optical conversion device.

Accordingly, the present technology provides a modular telemetry system that may be utilized along with various optical sensors. The present technology includes an open design of pluggable modules to address voltage, current, temperature, and vibration measurement within a common measurement platform. By way of example, several fibers can be mechanically fused or spliced into both the components of the analog optical conversion device 104 and the components of the various optical sensors to provide an integrated unit that provides a common optical processing and communications platform for the industrial, automation, condition monitoring, and utility sectors. While the present technology describes use of the modular upgradable system for connection with optical sensors for voltage, current, temperature, and vibration, it should be clear to anyone skilled in the art that the present technology can be used with any optical or non-optical type sensor including those that have not yet been developed. Thus, the uses of the present technology described herein are simply examples, and are not intended to limit scope of the present technology.

Having thus described the basic concept of the invention, it will be apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed:

1. An integrated modular opto-electronic telemetry device comprising:
    one or more opto-electronic telemetry device modules, each of the one or more opto-electronic telemetry device modules comprising:
    an analog optical conversion device located therein comprising an optical to analog converter and an analog to digital converter, the analog optical conversion device being configured to convert optical signals to digital facsimiles;
    a sensor cable mechanically spliced to the analog optical conversion device within the one or more opto-electronic telemetry device modules; and
    one or more optical voltage sensors, one or more optical current sensors, and an optical temperature sensor mechanically spliced to the sensor cable, wherein the sensor cable receives the optical signals from the one or more optical voltage sensors, the one or more optical current sensors, and the optical temperature sensor and provides the optical signals to the analog optical conversion device;
    a housing having openings configured to receive the one or more opto-electronic telemetry device modules, wherein the one or more optical voltage sensors, the one or more optical current sensors, and then the optical temperature sensor are located external to the housing;
    a backplane located in the housing and configured to be coupled to the analog optical conversion device of each of the one or more opto-electronic telemetry device modules when installed in the housing;
    a microcontroller coupled to the backplane and located within the housing, the microcontroller comprising a processor coupled to a memory and configured to execute one or more programmed instructions comprising and stored in the memory to:
    receive the digital facsimiles of the optical signals from the analog optical conversion device of each of the one or more opto-electronic telemetry device modules;
    determine one or more environmental factors in an environment of the analog optical conversion device, the one or more optical voltage sensors and the one or more optical current sensors based on the received digital facsimiles of the optical signals;
    receive temperature condition data from the optical temperature sensor related to the environment of the analog optical conversion device of each of the one or more opto-electronic telemetry device modules; and
    adjust the one or more determined environmental factors in the environment of the one or more optical voltage sensors and the one or more optical current sensors based on the received temperature condition data.

2. The device as set forth in claim 1, wherein the optical to analog converter comprises a photodiode.

3. The device as set forth in claim 1, wherein the housing is hermetically sealed.

4. The device as set forth in claim 1, wherein the sensor cable comprises a plurality of pigtailed optical fibers.

5. A method of making an integrated modular opto-electronic telemetry device, the method comprising:
    providing one or more opto-electronic telemetry device modules, each of the one or more opto-electronic telemetry device modules comprising:
    an analog optical conversion device located therein comprising an optical to analog converter and an analog to digital converter, the analog optical conversion device being configured to convert optical signals to digital facsimiles;
    mechanically splicing a sensor cable to the analog optical conversion device within the one or more opto-electronic telemetry device modules;
    mechanically splicing the sensor cable to one or more optical voltage sensors, one or more optical current sensors, and an optical temperature sensor to the sensor cable, wherein the sensor cable receives the optical signals from the one or more optical voltage sensors, the one or more optical current sensors, and the optical temperature sensor and provides the optical signals to the analog optical conversion device;
    providing a housing having openings configured to receive the one or more opto-electronic telemetry device modules, wherein the one or more optical voltage sensors, the one or more optical current sensors, and then the optical temperature sensor are located external to the housing;
    coupling a backplane located in the housing to the analog optical conversion device of each of the one or more opto-electronic telemetry device modules when installed in the housing;
    coupling a microcontroller to the backplane within the housing, the microcontroller comprising a processor coupled to a memory and configured to execute one or more programmed instructions comprising and stored in the memory to:
    receive the digital facsimiles of the optical signals from the analog optical conversion device;
    determine one or more environmental factors in an environment of the analog optical conversion device, the one or more optical voltage sensors and the one or more optical current sensors based on the received digital facsimiles of the optical signals;
    receive temperature condition data from the optical temperature sensor related to the environment of the analog optical conversion device of each of the one or more opto-electronic telemetry device modules; and
    adjust the one or more determined environmental factors in the environment of the one or more optical voltage sensors and the one or more optical current sensors based on the received temperature condition data.

6. The method as set forth in claim 5, wherein the optical to analog converter comprises a photodiode.

7. The method as set forth in claim 5 further comprising hermetically sealing the housing.

8. The method as set forth in claim 5, wherein the sensor cable comprises a plurality of pigtailed optical fibers.

\* \* \* \* \*